(12) United States Patent
Becker

(10) Patent No.: US 6,678,374 B1
(45) Date of Patent: Jan. 13, 2004

(54) TONE BASED ANSWER DETECTION FOR IP BASED TELEPHONES

(75) Inventor: Gary Becker, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 666 days.

(21) Appl. No.: 09/629,069

(22) Filed: Jul. 31, 2000

(51) Int. Cl.⁷ ................................................ H04M 3/00
(52) U.S. Cl. ...................... 379/377; 370/352; 379/424; 379/207.04; 379/418
(58) Field of Search ............................ 379/93.05, 93.07, 379/93.09, 93.14, 93.18, 93.28, 207.04, 207.05, 207.06, 207.08, 211.05, 265.09, 283, 282, 350, 372, 373.01, 377, 382, 387.01, 399.01, 418; 370/352

(56) References Cited

U.S. PATENT DOCUMENTS 5,974,043 A 10/1999 Solomon
6,009,151 A * 12/1999 Staples ..................... 379/90.01

FOREIGN PATENT DOCUMENTS

| DE | 198 13 179 A1 | 9/1999 |
| WO | WO 98/30007 | 7/1998 |
| WO | WO 00/35179 | 6/2000 |
| WO | WO 00/67452 | 11/2000 |

OTHER PUBLICATIONS

EPO Search Report dated Dec. 4, 2001.

* cited by examiner

Primary Examiner—Rexford Barnie
(74) Attorney, Agent, or Firm—John C. Moran

(57) ABSTRACT

Activating a switch by a handset where the switch is manually activated when the user wishes to answer an incoming call. While the switch is in the deactivated state, the handset transmits to a sound card within a personal computer a multi-frequency tone which is detectable by the sound card. When the manual switch is activated, the handset ceases to transmit the multi-frequency tone to the sound card. The sound card detects the absence of the multi-frequency tone to determine if the handset is answering a call. In traditional telephony terms, when the manual switch is activated, this is the offhook condition. When the manual switch is deactivated, this is the onhook condition . When the user is done with the call and deactivates the manual switch, the handset again generates the multi-frequency tone that is subsequently detected by the software via the sound card. Then, the software knows to signal the other party on the call that the call has been terminated. A headset is similarly designed to provide the same multi-frequency tone generation features as the handset.

10 Claims, 3 Drawing Sheets

TONE BASED ANSWER DETECTION FOR IP BASED TELEPHONES

TECHNICAL FIELD

This invention relates to telephones in general, and in particular two or more telephones communicating using an IP protocol.

BACKGROUND OF THE INVENTION

An IP softphone consists of a software package running on a personal computer (PC). The software emulates a telephone and communicates signaling and voice information via a IP-network connection between the PC and a telecommunication switching system (also referred to as a PBX). This network connection is often the Internet or a LAN. Audio information being received from the network is communicated with the user via a headset or handset via a sound card that interfaces the headset or handset to the PC. When a user speaks, the sound card converts the analog information into digital information that the software then transmits to a destination via the network. When a call is received via the network for the IP softphone, the software alerts the user via a speaker attached to the PC. The user then answers the call by selecting the softphone software application and selecting a soft button labeled "answer". The user then conducts a conversation with the caller via either the handset or the headset. To place a call, the user once again selects the software and selects a soft button labeled "Number" and proceeds to dial the destination number using a keypad or a pre-stored list of telephone numbers. The keypad can by either a soft keypad or the PC's keyboard.

A common problem is that while a user is walking into their office, they then hear the IP softphone ringing. To answer the call, the user must unlock the screen blanker to access the PC, select the software application, and actuate the soft button labeled "answer". Then, the user can pick up the handset or the headset and talk. The problem is that a great amount of time is involved in performing these steps. Frequently, before the user has completed the steps, the call is transferred to coverage such as a voice mail system.

An apparently obvious solution would be to have a switch in the handset that was activated when the handset was picked up to answer the call. However, the vast majority of sound cards do not have a physical input that can sense a switch. One solution that has been utilized is in the Microsoft Netmeeting application. Microsoft Netmeeting attempts to solve this problem by having an option referred to as "call, automatically accept calls". Utilizing this option, a user need only start listening and talking in order to participate in the call. The disadvantage of this option is that a call is always answered whether or not the user is available or not. This leads to a great deal of frustration for callers if the user is not there. Further, at times, the called party may simply not want to answer the call at a particular time.

SUMMARY OF THE INVENTION

This invention is directed to solving these and other problems and disadvantages of the prior art. According to the invention, a handset has a switch that is manually activated when the user wishes to answer an incoming call. While the switch is in the deactivated state, the handset transmits to a sound card within a personal computer a multi-frequency tone which is detectable by the sound card. When the manual switch is activated, the handset ceases to transmit the multi-frequency tone to the sound card. The sound card detects the absence of the multi-frequency tone to determine if the handset is answering a call. In traditional telephony terms, when the manual switch is activated, this is the offhook condition. When the manual switch is deactivated, this is the onhook condition. When the user is done with the call and deactivates the manual switch, the handset again generates the multi-frequency tone that is subsequently detected by the software via the sound card. Then, the software knows to signal the other party on the call that the call has been terminated. A headset is similarly designed to provide the same multi-frequency tone generation features as the handset.

These and other advantages and features of the present invention will become apparent from the following description of an illustrative embodiment of the invention taken together with the drawing.

DETAILED DESCRIPTION

Figure 1:
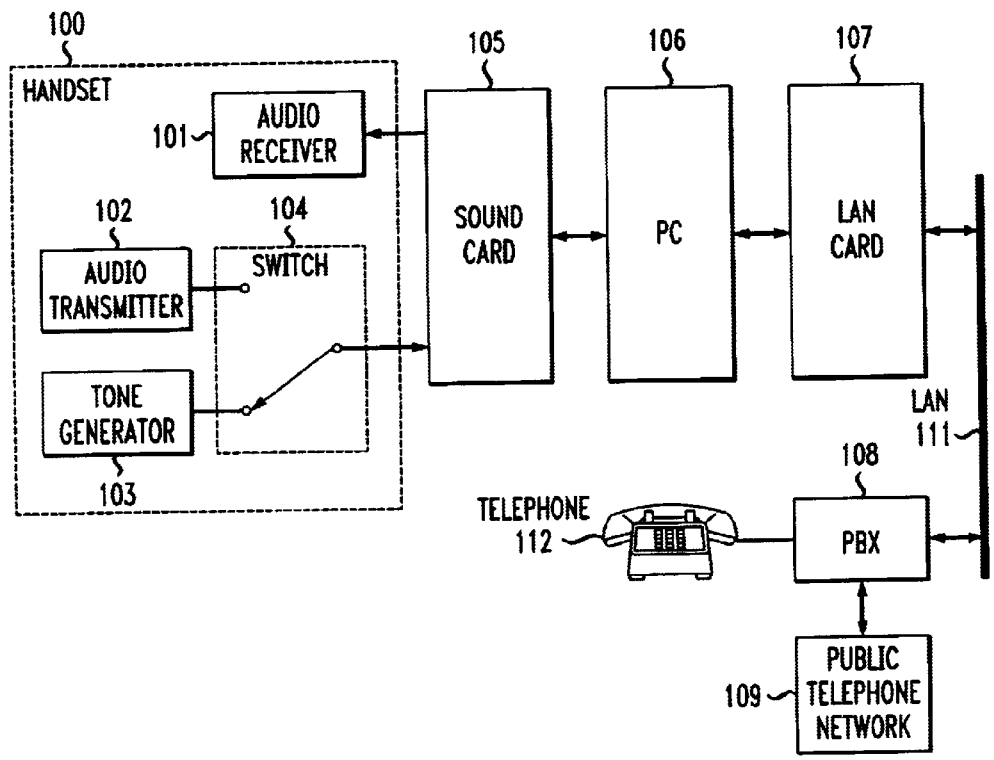
FIG. 1 illustrates, in block diagram form, a system for utilizing the present invention.

FIG. 1 illustrates the system for implementing the invention. In FIG. 1, PBX 108 is supplying telephone service for a user that is utilizing handset 100 via sound card 105, personal computer (PC) 106, LAN card 107 and LAN 111. PBX 108 supplies access to the general public by being interconnected to public telephone network 109. One skilled in the art would readily see that LAN card 107 and sound card 105 could be internal to PC 106. PBX 108 can advantageously be a Lucent Definity® Business Communication Switching System. PBX 108 supplies service for other users utilizing conventional telephones such as telephone 112. In addition, other handsets similar to handset 100 can be interconnected to LAN 111 by having individual sound cards, PCs and LAN cards. PC 106 receives control signaling and voice information from PBX 108, and PC 106 in turn transmits voice information and control signaling information to PBX 108 via LAN card 107 and LAN 111. Sound card 105 performs the function of converting audio information received from PC 106 to analog signals and transmitting these to audio receiver 108 that advantageously can be a simple speaker arranged in handset 100. Sound card 105 similarly converts audio information from audio transmitter 102 (that advantageously can be a simple microphone) to digital information which is transmitted to PC 106. In addition, sound card 105 also provides the facilities for converting the multi-frequency tone that is generated by tone generator 103 into digital information for detection by software. Software applications in PC 106 emulate a telephone such as telephone 112 with respect to PBX 108 with the exception that PBX 108 is transmitting and receiving information via LAN 111 rather than a telephone link. Sound card 105, PC 106, and LAN card 107 are of a conventional design well-known to those skilled in the art.

When not in use, handset 100 sets in a physical apparatus that deactuates switch 104 so that tone generator 103's output is selected for transmission to sound card 105. When a user picks up and places handset 100 to the user's ear, removal from the physical apparatus causes switch 104 to actuate so that the output of audio transmitter 102 is selected for transmission to sound card 105.

Consider the following example. If telephone 112 places a call to handset 100, PBX 108 transmits control signaling information to PC 106. PC 106 then provides an audio alerting sound via an internal speaker of PC 106 or other apparatus well-known to those skilled in the art. In addition, PC 106 transmits control information to sound card 105 that causes sound card 105 to perform a detection operation for the multi-frequency tone being generated by tone generator 103. When the user of handset 100 activates switch 104 by removing handset 100 from the physical apparatus, switch 104 now selects the output of audio transmitter 102. Sound card 105 then detects the absence of the multi-frequency tone from tone generator 105 and alerts PC 106 to this fact. In response, PC 106 transmits control information back to PBX 108 indicating that the call has been answered by handset 100. The telephone conversation then takes place in a normal manner by the user of handset 100 hearing speech from the user of telephone 112 via audio receiver 100 and speaking to the user of telephone 112 via audio transmitter 102. When the user of handset 100 ends the conversation by placing handset 100 on the physical apparatus, switch 104 is deactivated to select the output of tone generator 103. During the telephone call, software in PC 106 (audio client 202 of FIG. 2) continues to monitor for the multi-frequency tone from tone generator 103 after the tone has been converted to digital information by sound card 1-05. When this tone is detected again, this fact is transmitted as control information to PBX 108 by PC 106 indicating that the call has been disconnected, and PBX 108 responds in a normal manner.

Figure 2:
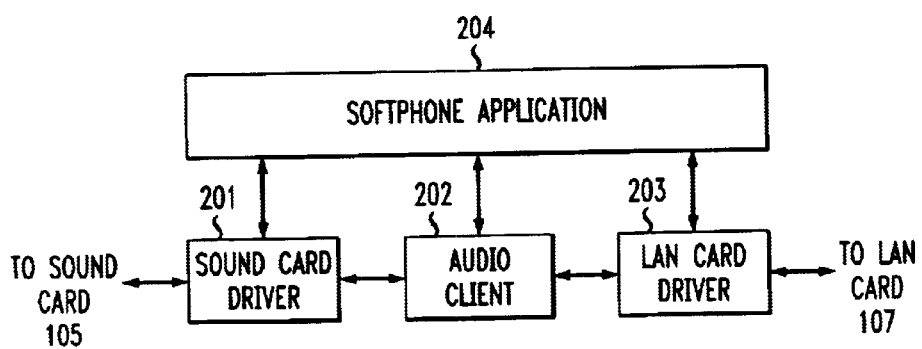
FIG. 2 illustrates, in block diagram form, a software structure for utilizing the present invention.

FIG. 2 illustrates, in block diagram form, the structure of the software within PC 106 utilized to provide the functions for handset 100. The messages transmitted among the software elements 201–204 are conveyed via a standard operating system not illustrated in FIG. 2. Drivers 201 and 203 provide the standard software interface to sound card 105 and LAN card 107, respectively. Such drivers are well-known to those skilled in the art. Softphone application 204 provides the overall control not only of the communication of calls with PBX 108 but also control over the functions of audio client 202. When the control information is received from PBX 108 indicating that there is an incoming call, this information is relayed from LAN card driver 203 to softphone application 204. Softphone application 204 then initiates sound card driver 201 to produce a ringing sound on the internal speaker of PC 106. In addition, softphone application 204 requests that sound card driver 201 start converting audio information from handset 100 to digital information and that audio client 202 start the detection for the absence of the multi-frequency tone from tone generator 103. When audio client 202 detects that the multi-frequency tone is no longer being received from sound card 105, it transmits control information to softphone application 204 indicating this fact. Softphone application 204 is responsive to the absence of the multi-frequency tone to transmit a control message to PBX 108 via LAN card driver 203 indicating that the call has been answered. Softphone application 204 then interacts with PBX 108 to exchange the necessary control information so that the call can be completed. Softphone application 204 controls audio client 202 so that audio client 202 is responsive to digital samples received from LAN card driver 203 to relay these to sound card driver 201 and to relay digital samples received from sound card driver 201 to LAN card driver 203. When the multi-frequency tone coming from sound card 105 is again detected by audio client 202, it signals this fact to softphone application 204. In response, softphone application 204 transmits a disconnect message to PBX 108 to cause the call to be terminated. If the user of telephone 112 hangs up on the call first, PBX 108 sends a disconnect message to softphone application 204 that resets the call state of the soft phone with respect to the software elements 201–204.

Figure 3:
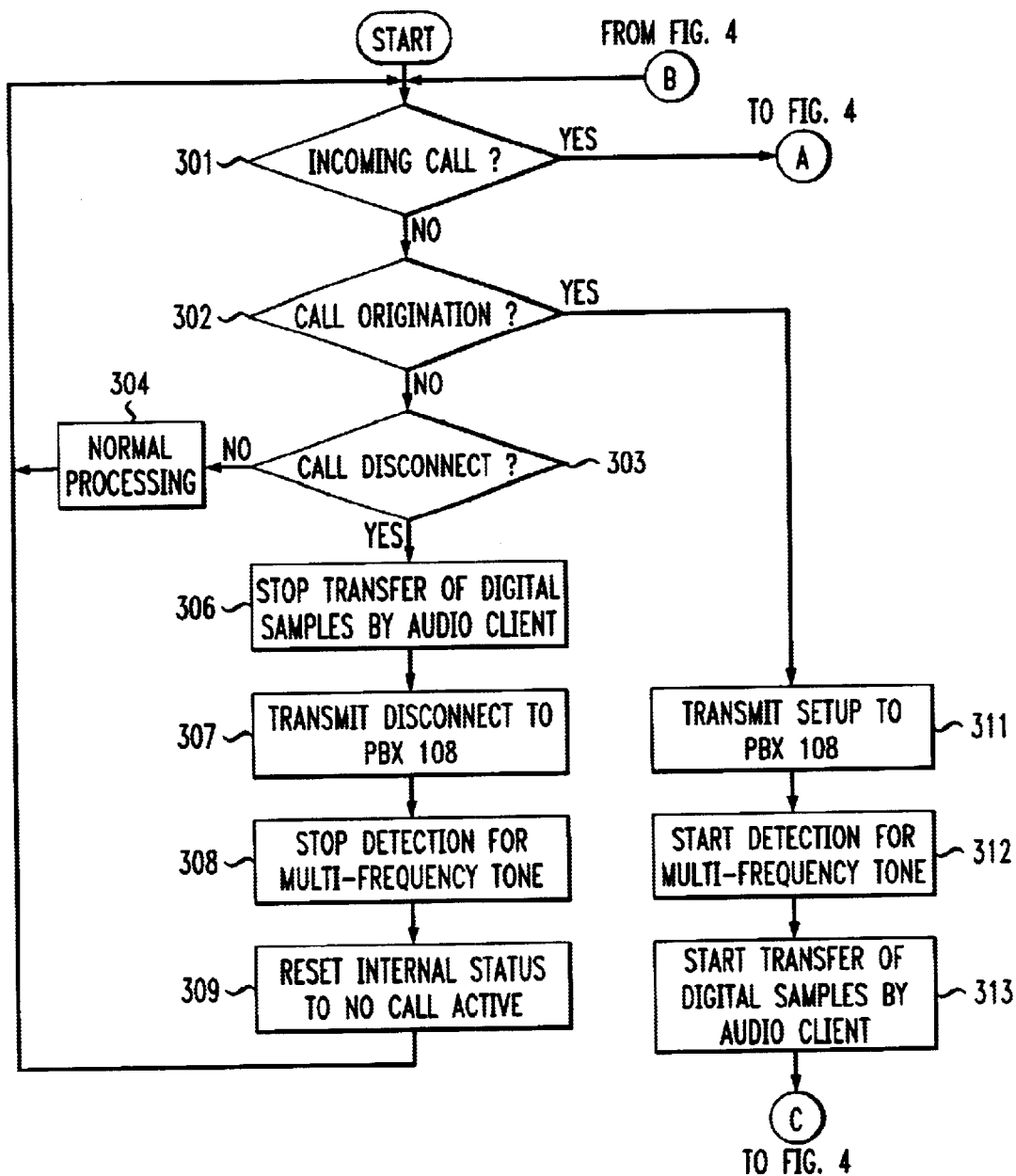
FIGS. 3 and 4 illustrate, in flowchart form, the steps performed by software applications.
Figure 4:
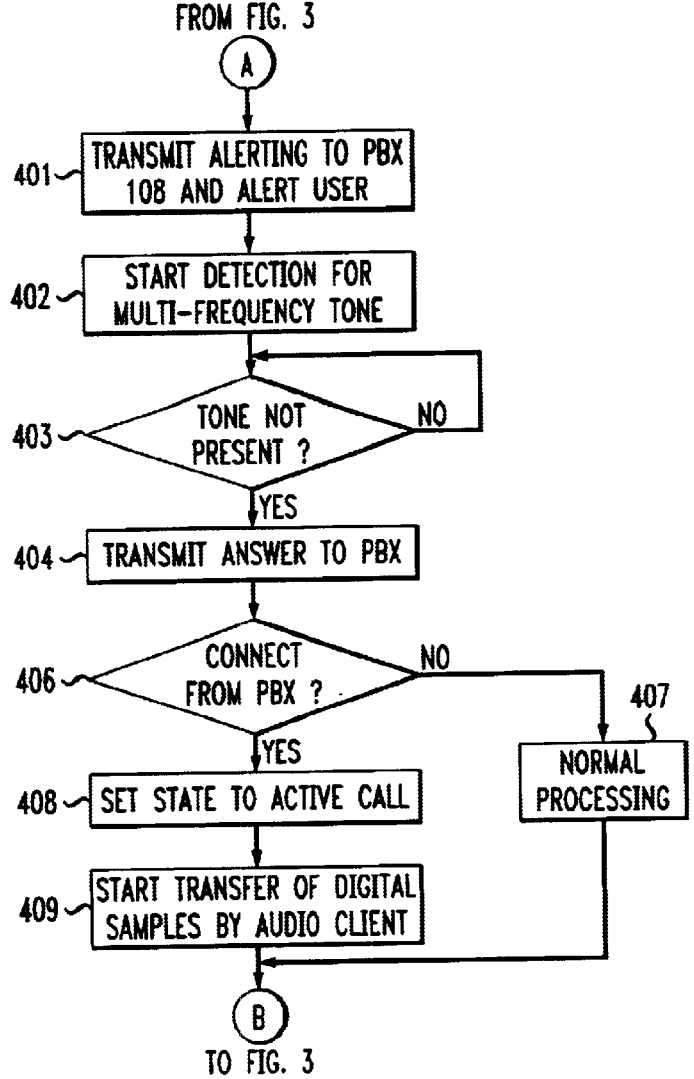
Figure 4:
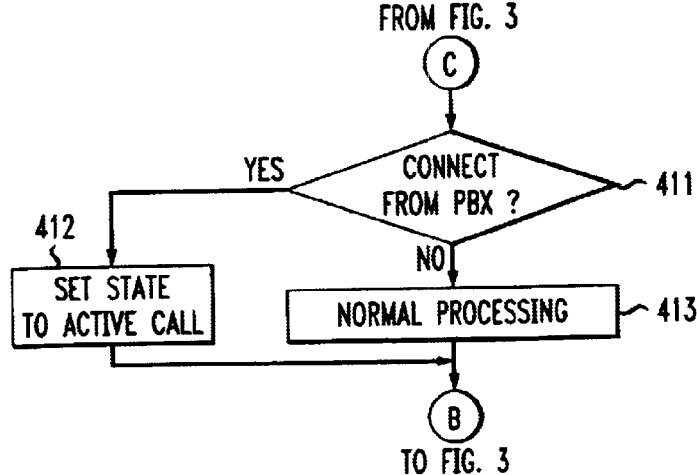

FIGS. 3 and 4 illustrate, in flow chart form, the steps performed by softphone application 204. Upon being started, decision block 301 checks to see if an incoming call is being received from PBX 108. If the answer is yes, control is transferred to block 401 that transmits an alerting message to PBX 108 indicating that the called telephone is being alerted. In addition, block 401 transmits.control information to the operating system of PC 106 to start the alerting utilizing the internal speaker of PC 106. Next, block 402 starts audio client 202 detecting for the multi-frequency tone. Decision block 403 determines when the softphone application receives a message indicating that the multi-frequency tone is no longer being detected. Once this message is received, decision block 403 transfers control to block 404 that transmits an answer message to PBX 108.

Block 404 then transfers control to decision block 406 which determines if a connect message is received from PBX 108. The connect message indicates that the call is fully set up between the calling telephone and the called telephone by PBX 108. If the connect message is not received, control is transferred to block 407 that performs the normal processing required to return the state of the software elements illustrated in FIG. 2 to the no active call state. If a connect message is detected, decision block 406 transfers control to block 408. The latter block sets the state of softphone application 204 to the active call state before transferring control to block 409. Block 409 initiates the transfer of digital samples by audio client 202 before transferring control back to decision block 301 of FIG. 3.

If the answer in decision block 301 is no, decision block 302 determines if a call origination is being performed by the user of handset 100. A call origination is done by the user interacting with softphone application 204 utilizing a GUI interface. If the answer is yes in decision block 302, control is transferred to block 311 which transmits a setup message to PBX 108 indicating that handset 100 is initiating a call. The setup message includes the telephone number of the called telephone. Next, block 312 starts the detection that watches for the multi-frequency tone by audio client 202 so as to determine when the user of handset 100 has terminated the call. Block 313 initiates the transfer of digital samples by audio client 202 before transferring control to decision block 411 of FIG. 4. Decision block 411 determines when a connect message is received from PBX 108 indicating that the call has been established. If a connect message is detected, control is transferred to block 412 which sets the state of softphone application 204 to the active call state before transferring control back to decision block 301 of FIG. 1. If the answer in decision block 411 is no, control is transferred to block 413 that does the necessary operations to return all software elements of FIG. 2 to the no active call state before transferring control back to decision block 301.

Returning to decision block 302, if the answer in decision block 302 is no, control is transferred to decision block 303 that determines if a call disconnect has been made by handset 100 or by the far end party hanging up. If the answer is no, control is transferred to block 304 that performs normal processing before returning control back to decision block 301. If the answer in decision block 303 is yes, control is transferred to block 306 that stops the transfer of digital samples by audio client 202. Next, block 307 transmits a disconnect message to PBX 108 to terminate the call. (Then, block 308 stops the detection for the multi-frequency tone by sound card 105. Block 307 also determines if a disconnect message is received from PBX 108; and if so, block 307 transmits an acknowledgement message to PBX 108.) Finally, block 309 re-sets the internal status of all of the software elements of FIG. 2 to the no call active state before transferring control back to decision block 301.

Of course, various changes and modifications to the illustrative embodiment described above will be apparent to those skilled in the art. Such changes and modifications can be made without departing from the spirit and scope of the invention and without diminishing its attendant advantages. It is therefore intended that such changes and modifications be covered by the following claims except insofar as limited by the prior art.

What is claimed is:

1. A method of determining call answer by an IP softphone that includes software executing on a personal computer and a handset having an audio receiver connected an input conductor, an audio transmitter connected to an output conductor, a switch, and a tone generator, comprising the steps of:

generating a tone by the tone generator;

selecting the tone by the switch for transmission on the output conductor upon the handset being idle;

selecting an output of the audio transmitter for transmission on the output conductor upon the handset being active;

interconnecting the handset to a telecommunication switching system via the personal computer;

receiving an incoming call from the telecommunication switching system by the personal computer;

connecting the incoming call to the IP softphone by the personal computer upon the tone not being received from the handset via a sound card; and communicating audio information between the handset and the telecommunication switching system by the personal computer after connection of the incoming call.

2. The method of claim 1 wherein the software comprises an audio client application and a softphone application, and the step of receiving the incoming call comprises the step of accepting a setup message from the telecommunication switching system by the softphone application.

3. The method of claim 2 wherein the step of connecting the incoming call to the IP softphone comprises the steps of converting the tone to digital information by the sound card under control of the audio client application;

determining absence of the digital information by the audio client application under control of the softphone application;

transmitting the determination to the softphone application by the audio client application; and transmitting a connect message to the telecommunication switching system by the softphone application in response to the transmitted determination.

4. The method of claim 3 wherein the step of communicating audio information comprises the steps of transmitting a request message to the audio client application by the softphone application; and controlling the sound card by the audio client application in response to request message to communicate audio information between the telecommunication switching system and the handset.

5. The method of claim 4 wherein the tone is a multi-frequency tone.

6. An apparatus for executing the method of claim 1.
7. An apparatus for executing the method of claim 2.
8. An apparatus for executing the method of claim 3.
9. An apparatus for executing the method of claim 4.
10. An apparatus for executing the method of claim 5.

* * * * *